(12) United States Patent
Hanfland et al.

(10) Patent No.: US 8,696,237 B2
(45) Date of Patent: Apr. 15, 2014

(54) ROAD PAVER WITH LAYER THICKNESS MEASURING DEVICE

(75) Inventors: Dennis Hanfland, Mannheim (DE); Ralf Weiser, Ladenburg (DE)

(73) Assignee: Joseph Vogele AG, Ludwigshafen/Rhein (DE)

(*) Notice: Subject to any disclaimer, the term of this patent is extended or adjusted under 35 U.S.C. 154(b) by 33 days.

(21) Appl. No.: 13/524,744

(22) Filed: Jun. 15, 2012

(65) Prior Publication Data

US 2012/0321384 A1    Dec. 20, 2012

(30) Foreign Application Priority Data

Jun. 15, 2011   (EP) ..................................... 11004887

(51) Int. Cl.
*E01C 19/22*   (2006.01)

(52) U.S. Cl.
USPC ......................................... 404/84.1; 404/118

(58) Field of Classification Search
USPC ............................. 404/84.1, 102, 118; 73/146
See application file for complete search history.

(56) References Cited

U.S. PATENT DOCUMENTS

| | | | |
|---|---|---|---|
| 4,571,695 A | | 2/1986 | Elton et al. |
| 4,796,998 A | * | 1/1989 | Soma et al. ................... 356/608 |
| 4,943,119 A | * | 7/1990 | Zarniko et al. ................ 299/1.5 |
| 5,163,319 A | * | 11/1992 | Spies et al. ....................... 73/146 |
| 5,201,604 A | | 4/1993 | Ferguson et al. |
| 5,258,961 A | * | 11/1993 | Sehr et al. ........................ 367/96 |
| 5,975,473 A | | 11/1999 | Haas et al. |
| 6,729,596 B2 | | 5/2004 | Fumado |
| 7,144,191 B2 | * | 12/2006 | Kieranen et al. ............. 404/84.1 |
| 7,172,363 B2 | | 2/2007 | Olson et al. |
| 7,581,329 B2 | | 9/2009 | Basham |
| 8,052,347 B2 | * | 11/2011 | Frankeny et al. ............. 404/118 |
| 2003/0000097 A1 | | 1/2003 | Docros |
| 2004/0056170 A1 | | 3/2004 | Fumado |
| 2005/0147467 A1 | | 7/2005 | Kieranen et al. |

(Continued)

FOREIGN PATENT DOCUMENTS

| | | |
|---|---|---|
| DE | 10025462 A1 | 12/2001 |
| DE | 10025474 A1 | 12/2001 |

(Continued)

OTHER PUBLICATIONS

U.S. Appl. No. 13/524,436, filed Jun. 15, 2012.

(Continued)

*Primary Examiner* — Gary Hartmann
(74) *Attorney, Agent, or Firm* — Fish & Richardson P.C.

(57) ABSTRACT

A road paver with a movable screed and with a layer thickness measuring device, which includes at least two sensors. The sensors are formed to carry out a distance measurement to the paving plane at intervals to determine a distance between the sensor and a point on the surface of the plane, said point being registered by the sensor. One of the two sensors defines a coordinate system. The layer thickness measuring device is formed to add as vectors the distance to the plane measured by the sensor that defines the coordinate system and a movement, relative to the plane and resulting from the driving of the road paver, of the coordinate system that is defined by the one sensor. In this way, a first vector can be determined which, together with a second vector, is used by the measuring device for determining the layer thickness of the laying material.

20 Claims, 5 Drawing Sheets

(56) References Cited

U.S. PATENT DOCUMENTS

| | | |
|---|---|---|
| 2008/0263881 A1 | 10/2008 | Basham |
| 2010/0014916 A1 | 1/2010 | Green |
| 2012/0321385 A1* | 12/2012 | Hanfland .................... 404/84.1 |
| 2012/0321386 A1* | 12/2012 | Hanfland et al. ............. 404/118 |
| 2013/0051913 A1* | 2/2013 | Eul ............................. 404/84.5 |

FOREIGN PATENT DOCUMENTS

| | | |
|---|---|---|
| DE | 19851153 C1 | 9/2009 |
| EP | 0510215 A1 | 10/1992 |
| EP | 542297 B1 | 4/1995 |
| EP | 510215 B1 | 5/1997 |
| EP | 1403434 A1 | 3/2004 |
| EP | 1403434 B1 | 4/2008 |
| GB | 2448820 A | 10/2008 |
| JP | 1271504 A | 10/1989 |
| JP | 1278603 A | 11/1989 |
| JP | 4272303 A | 9/1992 |

OTHER PUBLICATIONS

U.S. Appl. No. 13/524,517, filed Jun. 15, 2012.

European Search Report mailed Dec. 2, 2011, which issued in corresponding EP Application No. 11004889.9.

European Search Report mailed Nov. 25, 2011, which issued in corresponding EP Application No. 11004888.1.

European Search Report mailed Dec. 14, 2011, which issued in corresponding EP Application No. 11004887.3.

European Search Report mailed Nov. 25, 2011, which issued in corresponding EP Application No. 11004888.

European Search Report mailed Dec. 2, 2011, which issued in corresponding EP Application No. 11004889.

European Search Report mailed Dec. 14, 2011, which issued in corresponding EP Application No. 11004887.

English Translation of Japanese Official Action mailed Jul. 2, 2013, which issued in corresponding JP Application No. 2012-134613.

* cited by examiner

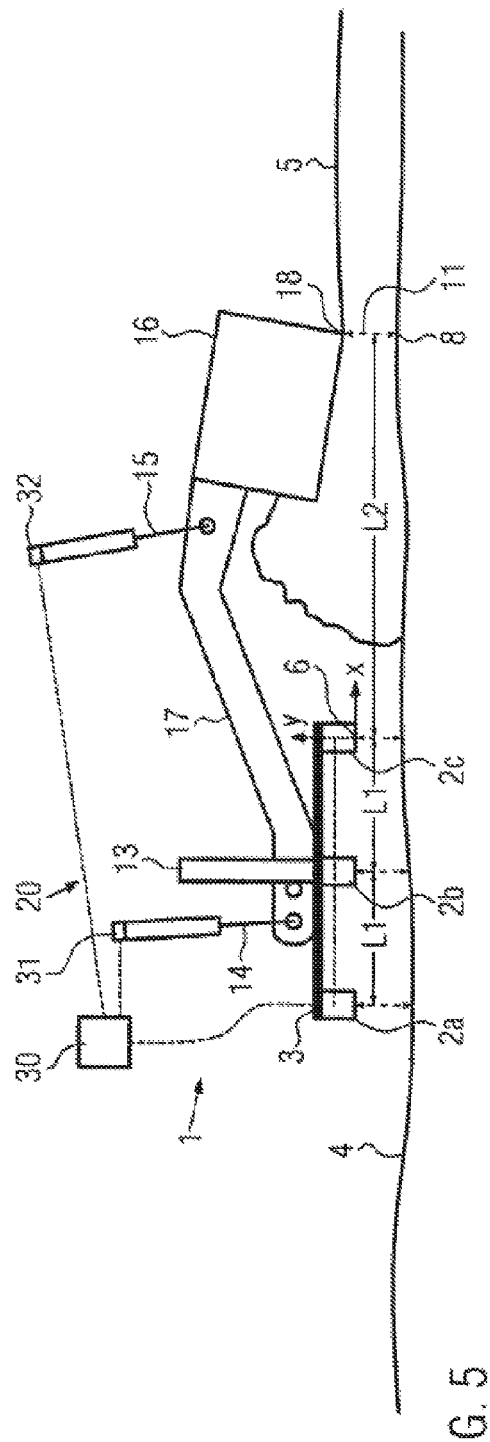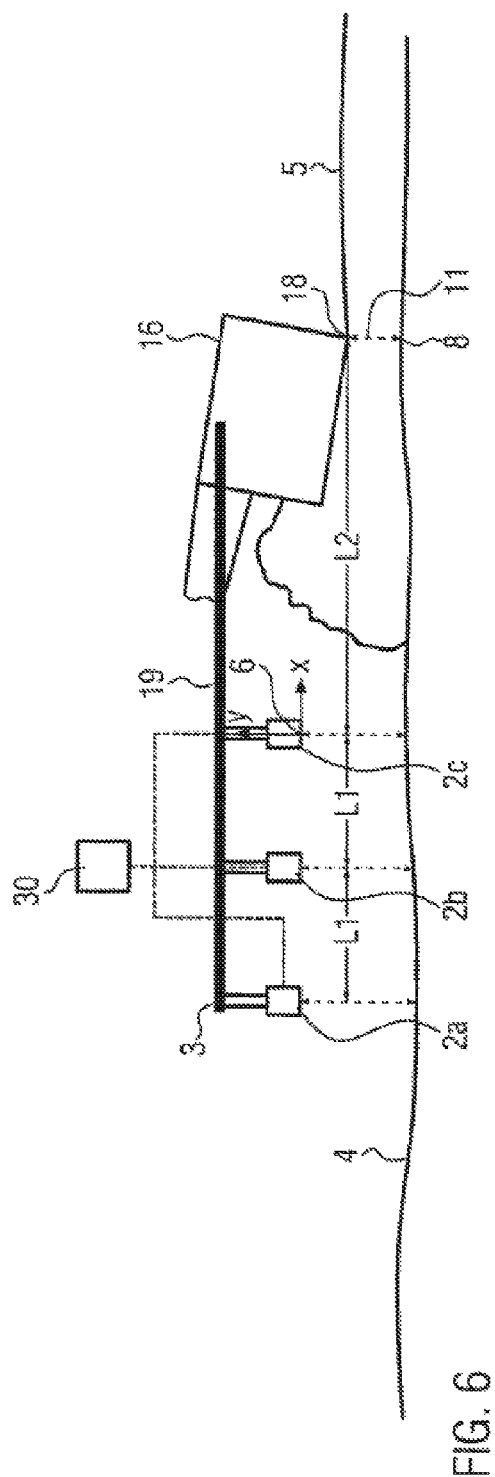

ROAD PAVER WITH LAYER THICKNESS MEASURING DEVICE

The present invention relates to a road paver with a moveable screed and a layer thickness measuring device.

BACKGROUND OF THE INVENTION

The thickness of a layer produced during the construction of a road should be measured continuously and, if possible, in real time. Because the requirements with regard to the precision of the paving dimensions are relatively high in practice, it is not sufficient if the plane is recorded at a place in front of the screed and combined directly with a rear edge of the screed for the thickness of the produced road pavement, because this fails to take into consideration unevennesses of the plane.

In practice, systems are known that determine the thickness of the road pavement by means of direct measurement, for example, by means of ultrasound or radar. The disadvantage in this case, however, is that to some extent, reflective bodies must be employed for an exact measurement of the thickness of the road pavement in order to be able to locate the boundary layer precisely.

In another method for determining the layer thickness of a newly produced road pavement, measurement bodies are slid into a newly laid layer. This, however, can result in substantial damage to the newly laid pavement.

A further known approach provides for storage and combination of the values measured on the plane, whereby a reference is used in order to connect all values to one another.

In practice, the layer thickness is also calculated using an inclination sensor. This is described, for example, by DE 100 25 462 A1. This document discloses a device for determining the thickness of the paving layer on the basis of a predetermined distance between the position of a height sensor and the screed rear edge, the registered height above the subgrade and a determined tow arm-screed assemblage inclination, which is determined by means of an inclination sensor.

The use of inclination sensors, however, has the technical disadvantage that these are susceptible to all sorts of accelerations and therefore lead to an imprecise measurement result. In particular, the inclination sensors are disturbed during their measurement by shaking or by vibrations transferred to the screed assemblage. Small errors in the inclination sensors thereby cause large errors in the calculation of the layer thickness.

It is likewise problematic if a large number of distance sensors is needed to faithfully reproduce the surface of the plane, because all measured values of the sensors must be connected to one another in order to create a suitable reference. This method is complicated and additionally requires expensive equipment in order to determine the suitable reference.

In practice, external references are also used in order to determine the layer thickness of a newly laid road pavement. The external references are thereby positioned or mounted alongside the road paver. This is impractical, however, because either the complete section must first be provided with such references or the references must be moved at regular distances in order to allow a continuous determination of the layer thickness.

DE 100 25 474 A1 describes a device for determining the layer thickness of a laying material to be applied to a subgrade by a road paver, whereby the road paver has a tractor, at least one tow arm mounted rotatably on the tractor in a manner that allows the height to be adjusted, a floating screed rigidly attached to the at least one tow arm that, with the tow arm, forms a tow arm-screed assemblage and an undercarriage lying with its bottom side on the base. The device furthermore comprises a distance sensor attached in a stationary manner to the tractor, for measuring a relative distance between a reference position of the tractor and a reference position of the tow arm-screed assemblage, whereby the reference position of the tractor has a predetermined positional relationship to the bottom side of the undercarriage, and the reference position of the tow arm-screed assemblage has a predetermined positional relationship to a lower back edge of the screed.

DE 198 51 153 C1 relates to a method for measuring a driving surface, in which the driving surface profile is registered metrologically. Here, a driving surface is, in particular, a traffic area, e.g. a street or a highway, that is set up with a number of coats or layers in the framework of highway construction or repair work. The invention furthermore relates to a system for carrying out the method with a mobile testing device.

EP 0 510 215 B1 describes a device for regulating a driving surface cover thickness. The device comprises height sensors and inclination sensors, all of which are arranged on a screed assemblage in such a way that they follow a movement of the screed.

U.S. Pat. No. 7,172,363 B2 refers to a paving machine. The paving machine can have a power source, a traction system, a hopper that is configured to hold paving material, and one or more conveyors that are configured to transfer the paving material from the hopper. The paving machine can also have a plate or a screed board that is configured to lay out a mat of the paving material. The paving machine furthermore comprises at least one front sensor that is mounted on a front part of the paving machine and configured in order to measure the height from a surface to the front sensor, and at least one rear sensor that is mounted on the paving machine and configured in order to measure the height from a surface of the mat to the rear sensor. The paving machine also comprises a controller that is configured to determine a thickness of the mat by determining a difference between one or more front height measurements that have been recorded by at least one front sensor, and one or more rear height measurements that have been recorded by the at least one rear sensor. The sensors are mounted on a support that is permanently connected to the screed.

Although the use of inclination sensors mentioned at the beginning is not problem free, it would likewise not be reasonable to disregard the inclination reference generated in this way on an uneven subgrade, because doing so would make it impossible to carry out an exact measurement of the layer thickness of the road pavement.

SUMMARY OF THE INVENTION

In light of the problems and disadvantages that result from the state of the art, the object of the invention is based on registering, as precisely and practicably as possible, a layer thickness of a newly laid road pavement using simple, constructive technical features.

This object is solved with the pavement thickness measuring arrangement and method of the present invention.

The invention relates to a road paver with a movable screed and with a layer thickness measuring device that comprises at least two sensors. The sensors are formed to carry out a distance measurement to the plane at intervals, in order to determine by vectors a distance between the sensor and a point on the surface of the plane, said point being registered by the sensor. One of the two sensors furthermore defines a coordinate system. According to the invention, the layer thickness measuring device is adapted to combine, for example to add, by vectors the distance to the plane measured by the sensor that defines the coordinate system, with a movement, relative to the plane and caused by the driving of the road paver, of the coordinate system defined by the one sensor to the plane. As a result, a first vector can be determined that can be used, together with a second vector, by the layer thickness measuring device for determining the layer thickness of the laying material.

The invention makes it possible to measure with precision the layer thickness of the laid road pavement while the road paver is driving. It is advantageous that the layer thickness measuring device according to the invention manages to determine the layer thickness without the use of inclination sensors. Furthermore, the sensors used for distance measurements are insensitive to accelerations of the road paver.

Using the invention, it is furthermore possible to determine an exact layer thickness of the road pavement without thereby providing the same with additional reflective bodies. In the case of the invention, there is likewise no need for external references that would have to be positioned along the paving section with what is usually a great effort or that possibly would have to be moved during the paving run of the road paver.

By means of registering the displacement of the coordinate system, the inclination reference can be produced in a simple way in order to conclude from it the layer thickness by means of vector calculation in a simple, unconventional way. In this way, it is likewise possible to take unevennesses of the paving into consideration in the calculation of the layer thickness.

In addition, the layer thickness measuring device according to the invention can be manufactured simply and economically and can be mounted to different places on the road paver without a great effort.

In a further embodiment of the invention, the layer thickness measuring device comprises an evaluation unit that registers the displacement of the coordinate system relative to the subgrade during the paving run. The evaluation unit is formed to register the measurement results of the height measurement carried out at intervals by the sensors in order then to determine the longitudinal and height displacement, but also the change in inclination of the coordinate system between two points in time. Using the evaluation unit, it is possible at a certain points in time during the paving run to register the layer thickness at one place at which a height measurement has previously been carried out and at which paving material has already been incorporated.

The result of the calculated layer thicknesses can preferably be retrievable visually and in real-time from the evaluation unit by an operator interface, which is available to the operating personnel of the paver.

The layer thickness measuring device preferably comprises three (or more) sensors. With the three sensors, the layer thickness measuring device can produce with particular precision an inclination reference for calculating the layer thickness. It would also be conceivable to provide to the layer thickness measuring device at least two sensor groups, each comprising at least two sensors, in order to further improve the measurement result. It is advantageous if the plurality of sensors of each sensor group are arranged in a row either in the direction of travel or perpendicular to the direction of travel.

It is also advantageous if all sensors are formed to carry out the distance measurement to the plane at intervals. This makes an exact layer thickness measurement retrievable at regular distances. It would furthermore be possible to form the evaluation unit in such a way that, by means of the measurement results of the respective sensor groups, it is capable of forming for each sensor group an averaged distance in order to use said averaged distance to measure the displacement of the coordinate system. The evaluation unit could thereby also be formed to filter extreme height differences out of the determination of the respective average value. As a result, construction tools lying around next to the paving section cannot negatively influence the measurement result.

In a further embodiment of the invention, the rearmost sensor or the rearmost sensor group in the direction of travel defines the coordinate system. As a result, the calculation of the first vector, but also the registration of the displacement of the coordinate system, can be simplified.

In an improved embodiment, all sensors or sensor groups are arranged equidistant from one another with regard to a distance in the direction of travel. By means of this distance, it is possible to stipulate a measure for the distance measurement to the plane at intervals in a simple way.

The layer thickness measuring device is preferably formed to measure the layer thickness at a place that is set back, at least by the distance or by a multiple of the distance, from the sensor that defines the coordinate system. In this way it is possible to measure the layer thickness by looking back at a place that is set back relative to the place of the momentary height measurement by the distance separating the sensors or sensor groups or by a multiple thereof.

In a further embodiment of the invention, the layer thickness measuring device comprises a support that is arranged rigidly relative to the road paver. The sensors of the layer thickness measuring device are preferably arranged equidistantly on the support. The mounting of the support directly on the road paver has the technical advantage that the support itself, and particularly the layer thickness measuring device mounted thereupon, is supported robustly and therefore absorbs no or only few vibrations that could act in a disruptive manner during the distance measurement.

As an alternative to this, the layer thickness measuring device comprises a holder that is arranged rigidly with respect to the screed. The sensors should also be arranged equidistantly on this holder. The rigid attachment of the layer thickness measuring device relative to the screed has the technical advantage that the position of the actuating cylinder for raising and lowering the screed does not have to be taken into consideration for calculating the layer thickness. This simplifies the calculation of the layer thickness and reduces the potential for error during the calculation.

In a further embodiment of the invention, the sensors are arranged directly on a tow arm that supports the screed. This arrangement allows a total weight of the road paver that is less than that when the sensors are arranged on a support or on a holder, whereby this weight reduction leads to reduced fuel consumption.

A further embodiment of the invention provides for the screed to comprise a rear edge whose distance from the layer thickness measuring device, particularly to the sensor that defines the coordinate system, defines the second vector. The rear edge of the screed forms a reliable and simple reference in order to define the second vector.

In a further advantageous embodiment of the invention, the layer thickness measuring device comprises an (e.g. fourth) sensor that is arranged, seen in the direction of travel of the road paver, at a certain distance behind the screed, meaning it is arranged behind the rear edge. This sensor is preferably formed to measure the distance to the freshly laid material behind the screed. The downstream sensor can lead to an especially precise layer thickness determination, because it is positioned at a sufficient distance away from the rear edge, where the paving material no longer deforms.

Like the previously mentioned sensors or sensor groups, the sensor arranged behind the screed is preferably mounted on the same support or on the same holder, whereby the support or holder projects backwards beyond the screed. As a result, it is possible to keep the distance between the sensor and the sensor that defines the coordinate system constant. As an alternative to the (fourth) sensor, it is possible to supplement the same with a further sensor that is arranged in a row with the fourth sensor, perpendicular to the direction of travel. In this way, again, as previously described with respect to the sensor groups, it is possible to calculate an averaged distance to the newly laid pavement by means of the evaluation unit.

The sensors for the distance measurement to the plane or to the surface of the newly laid road pavement are preferably acoustic and/or optic sensors, particularly ultrasound or laser sensors. In this way, contactless distance measurement is possible.

In addition to the road paver according to the invention, the invention relates to a method for determining a layer thickness of a laying material laid by a road paver on a plane. The road paver thereby supports a movable screed and a layer thickness measuring device, which comprises at least two sensors, whereby the sensors carry out a distance measurement at intervals in order to determine a distance between the respective sensor and a point on the surface of the plane, said point being registered by the sensor. One of the sensors furthermore defines a coordinate system. According to the invention, the layer thickness measuring device determines a first vector in that it adds as vectors a distance previously determined by the sensor that defines the coordinate system to a movement, relative to the plane and resulting from the driving of the road paver, of the coordinate system defined by the one sensor. It is furthermore provided that the layer thickness measuring device adds the first vector to at least a second vector in order to determine the layer thickness.

The same advantages result due to the method according to the invention that were already described above with reference to the road paver according to the invention.

BRIEF DESCRIPTION OF THE DRAWINGS

Embodiments of the invention are explained on the basis of the drawings.

Shown are.

DETAILED DESCRIPTION OF THE INVENTION

Figure 1:
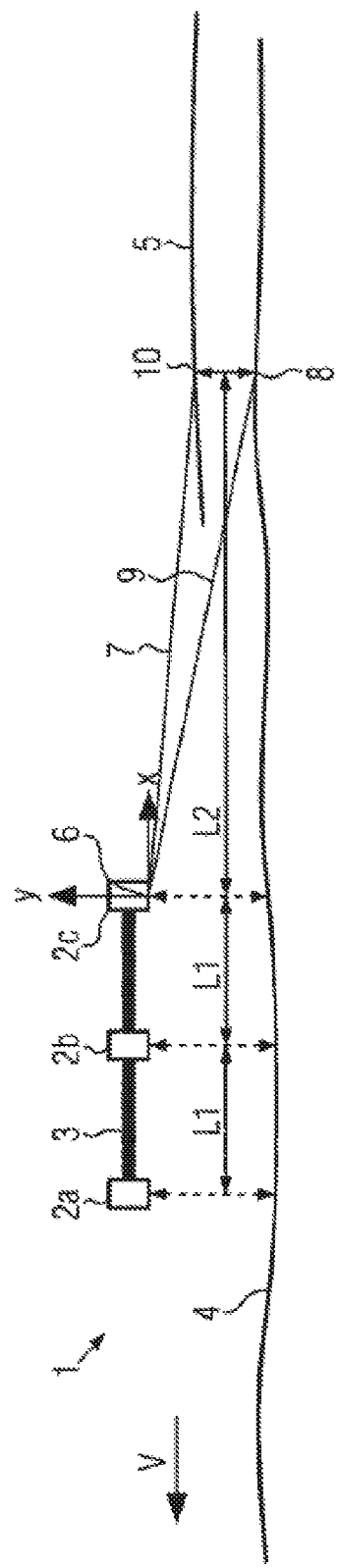
FIG. 1 An embodiment of the layer thickness measuring device as it is used in the invention for a road paver for determining the layer thickness, FIG. 2 A position of the advantageous layer thickness measuring device from FIG. 1 relative to the plane at a point in time T-1 and at a point in time T, FIG. 3 A relocation at intervals of the advantageous layer thickness measuring device along the points in time T-3, T-2, T-1 and T, FIG. 4 A schematic depiction for determining the first vector, which is used for determining the layer thickness, FIG. 5 An advantageous layer thickness measuring device with a support for mounting to the road paver, FIG. 6 An advantageous layer thickness measuring device with a holder for mounting on the screed, FIG. 7 An embodiment of the invention in which the sensors are mounted directly to a towing part supporting the screed, and FIG. 8 An embodiment of the layer thickness measuring device with a fourth sensor that is positioned behind the screed.

FIG. 1 shows an advantageous embodiment of the layer thickness measuring device 1. The layer thickness measuring device 1 comprises three sensors 2a, 2b, 2c, that are arranged equidistant to one another, spaced apart by a distance L1. The sensors 2a, 2b, 2c are arranged on a holder 3 which is shown in FIG. 1 essentially horizontal to a plane 4. Seen in the direction of travel V, the rear-most sensor 2c defines a coordinate system 6. The coordinate system 6 comprises an X-axis that is arranged essentially parallel to the holder 3, as well as a Y-axis that is arranged essentially perpendicularly to the holder 3.

FIG. 1 likewise shows a road pavement with a surface 5 that has been laid on the plane 4. A first vector 9 is directed from the origin of the coordinate system 6 to a point 8 that lies on the plane 4. A second vector 7 likewise points from the origin of the coordinate system 6 to a point 10 that lies on the surface 5 of the newly laid layer. The layer thickness 11 of the road pavement is shown between the points 8 and 10.

It furthermore follows from FIG. 1 that there is a distance L2, in a horizontal projection or perpendicular to the measuring direction of the sensor 2c, lying between the sensor 2c that defines the coordinate system 6 and the place provided for the layer thickness determination, whereby the layer thickness of said place is reflected by the points 8 and 10 that are spaced a distance apart. The distance L2 determines a distance between the origin of the coordinate system 6 and the place at which the layer thickness measurement should be carried out. The distance L2 is preferably equal to the distance L1, or it corresponds, as shown in FIG. 1, to a multiple of the distance L1.

The three sensors 2a, 2b, 2c have a geometrically defined position with respect to the reference coordinate system 6. Using the three sensors 2a, 2b, 2c it is possible to carry out a distance measurement to the plane 4 at intervals, in order to register, in addition to the covered path and the height displacement, likewise the change in the inclination of the reference coordinate system 6 at different points in time T-3, T-2, T-1, T (see FIG. 3).

Figure 2:
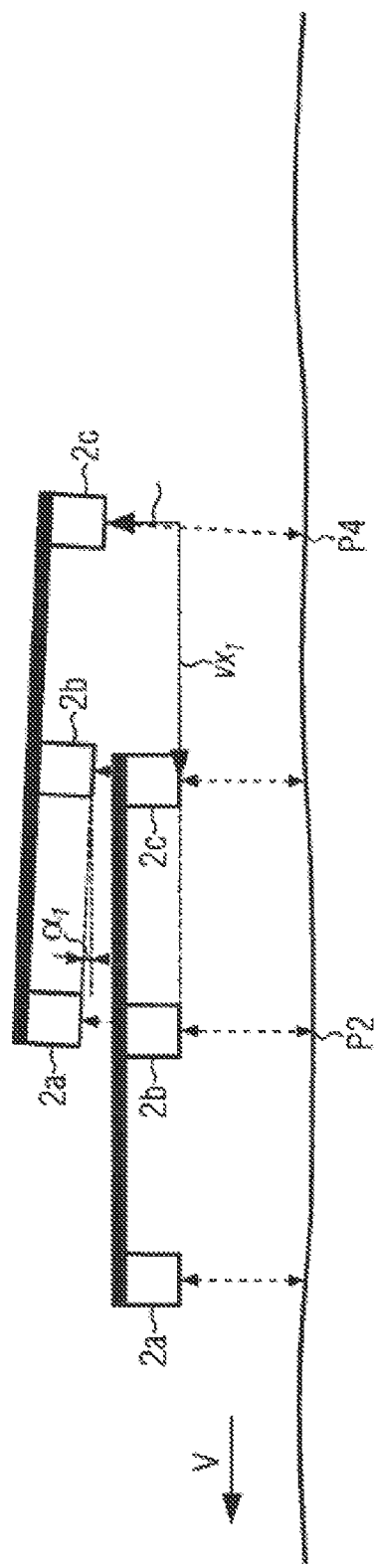

FIG. 2 shows a displacement of the reference coordinate system 6 of the layer thickness measuring device in the direction of travel V at different points in time T1 and T. FIG. 2 shows a displacement of the reference coordinate system 6 by means of a height displacement vy, a longitudinal displacement vx, along the direction of travel V, as well as a change in inclination a1. At the point in time T-1, the sensors 1a, 1b, 1c each register a distance to the plane 4 that extends up to the points P2, P3, P4. Offset in time, due to a movement of the road paver in the direction of travel V, the reference coordinate system 6 defined by the rear-most sensor 2c is relocated along the height displacement vy, as well as along the longitudinal displacement vx, and by the inclination angle α1, which results in the position of the layer thickness measuring device at the point in time T. At the point in time T, the sensors 2a, 2b, 2c determine the distance to the plane 4, which in each case extends up to point P1, P2, P3. The distance measurement has thereby taken place in an interval that corresponds to the distance between the sensors 2a, 2b, 2c, meaning L1.

Figure 3:
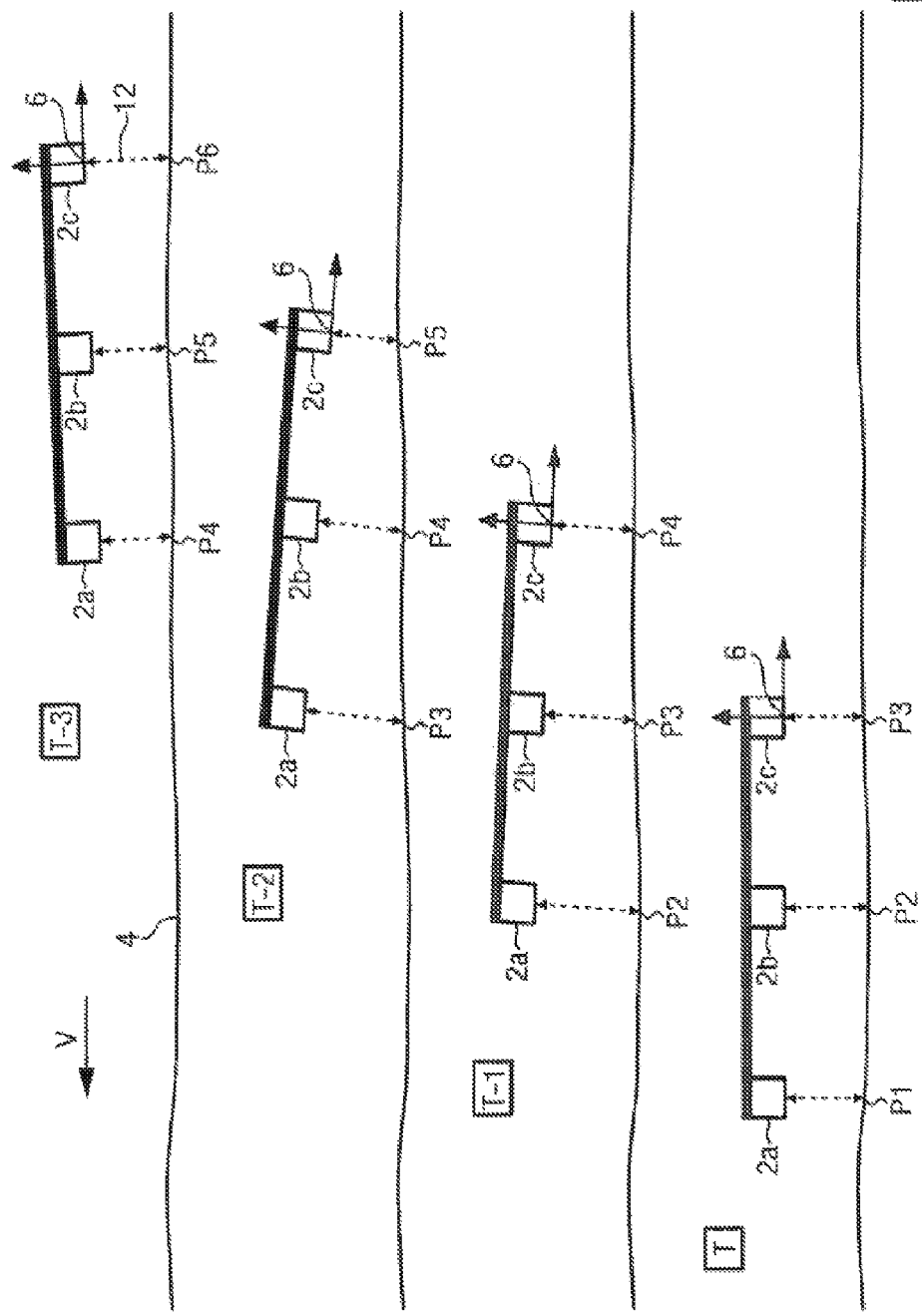

FIG. 3 shows a relocation of the layer thickness measuring device 1 along the direction of travel V at the points in time T-3, T-2, T-1 and T, whereby the sensors 2a, 2b, 2c carry out a distance measurement to the plane 4 at an interval of the distance L1. It can be seen that the layer thickness measuring device 1, particularly the reference coordinate system 6, moves differently from interval to interval, meaning during the coverage of the distance L1, which can be explained by unevennesses in the plane 4, i.e., to a different height setting of the screed to offset the unevennesses. The distances to the plane 4 are registered by the sensors 2a, 2b, 2c per interval.

FIG. 3 shows that, for example, at the point in time T-1, the sensor 2a is directed at the same point P2 as the sensor 2b is at the point in time T. This calculation assumes that only small changes in the inclination take place during the paving run.

Figure 4:
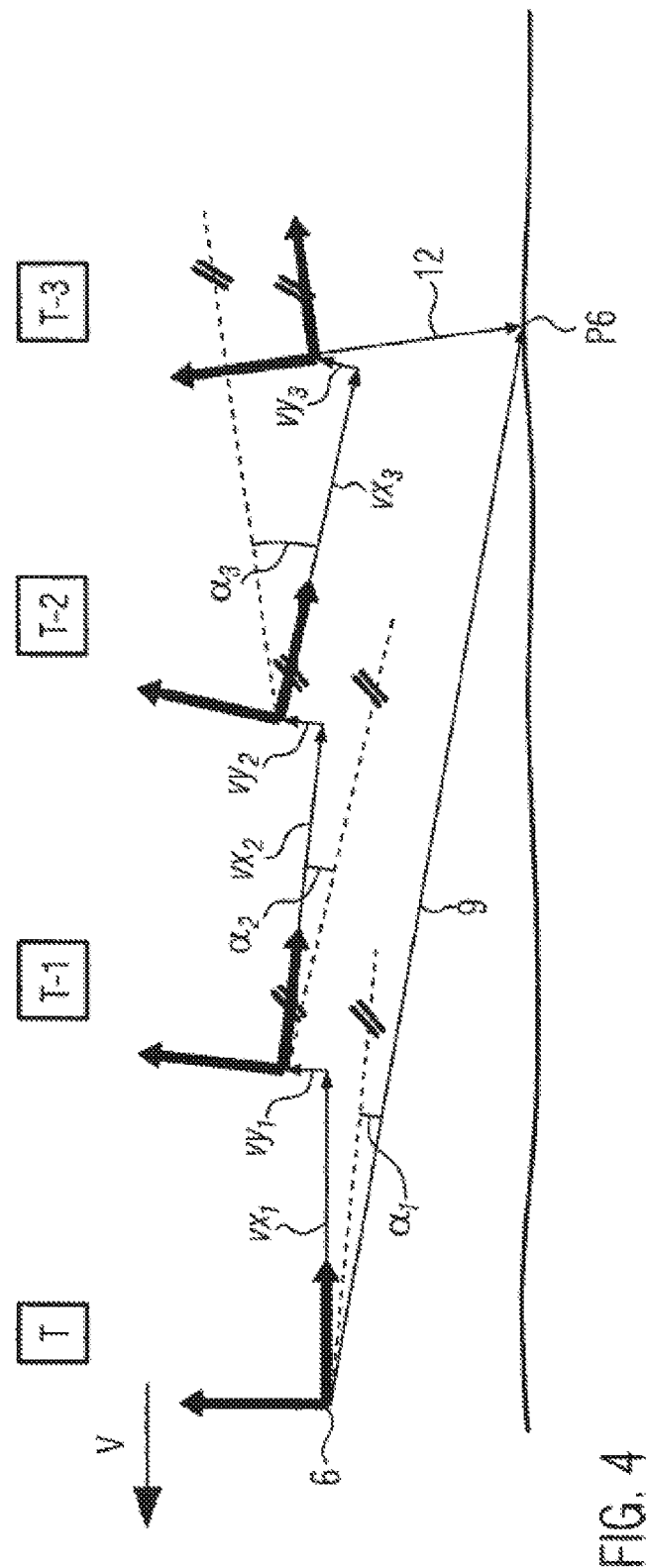

The displacement of the reference coordinate system 6 across the points in time T-3 to T is shown in FIG. 4 by vectors. The vector 9 leads from the reference coordinate system 6 at the point in time T to the point P6, which indicates the place 8 shown in FIG. 1. The vector 9 results from the transformation of the distance 12 registered by the sensor 2c at the past point in time T-3 to be covered to the positioned reference coordinate system 6 at the point in time T. This corresponds to the sum of the measured value 12 at the point in time T-3 and the vectorial path through $vy_3$, $vx_3$, $vy_2$, $vx_2$, $vy_1$ and $vx_1$. As a result, the changes in inclination $\alpha1$, $\alpha2$, $\alpha3$ of the reference coordinate system 6 that occur during the drive are taken into account for calculating the layer thickness 11. The vector 9 determines the place 8, i.e., the point P6 at which the layer thickness is measured.

FIG. 5 shows an advantageous layer thickness measuring device 1 that is mounted on a road paver 20, especially on the chassis of the road paver 20, by means of a support 13. The support 13 is mounted perpendicularly on the holder 3, which bears the sensors 2a, 2b, 2c. The support 13 is aligned essentially perpendicularly to the plane 4. FIG. 5 furthermore shows a movable tow arm 17 of the road paver 20, whereby a screed 16 is mounted on the tow arm 17. The screed 16 comprises a rear edge 18, which runs along with the place 10, at which the layer thickness 11 is preferably determined. The place 10 is depicted by FIG. 1. The tow arm 17 is supported by actuating cylinders 14, 15 in such a way that the height can be adjusted. The actuating cylinders 14, 15 can be activated in such a way that, by means of a corresponding height adjustment, they offset unevennesses on the plane 4 in such a way that even then, a flat road pavement can be laid by the screed 16.

FIG. 4 furthermore shows an evaluation unit 30 that, as shown schematically by means of a dashed line, is electrically connected to the sensors 2a, 2b, 2c in order to register their measurement results. The evaluation unit 30 is furthermore connected to sensors 31, 32 which register a position of the actuating cylinders 14, 15 and pass this on to the evaluation unit 30 for determining the layer thickness 11. By means of the geometric shape of the road paver 20 and of the tow arm 17, as well as by means of the positions of the actuating cylinder 14, 15 registered by the evaluation unit 30, it is possible to determine the position of the rear edge 18 in relation to the reference coordinate system 6. The evaluation unit 30 is consequently able to determine the second vector 7 between the coordinate system 6 and the determined position of the rear edge 18 in order to combine this with the first vector 9 into the layer thickness 11.

Figure 7:
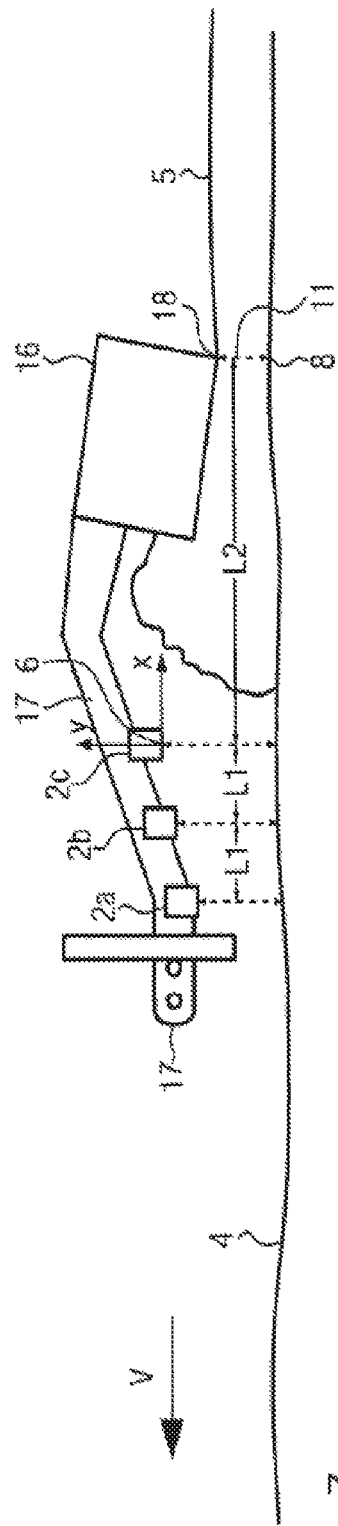

Unlike in FIG. 5, FIG. 6 does not show a direct mounting of the layer thickness measuring device 1 on the road paver, and instead shows a mounting on the screed 16. The layer thickness measuring device 1 is mounted on the screed 16 by means of a holder 19, that results from an extension of the holder 3. Due to the direct rigid connection of the three sensors 2a, 2b, 2c on the screed 16 by means of the holder 19, a calculation of the position of the actuating cylinders 14, 15 is not necessary in order to determine the layer thickness 11 at the place 10 or underneath the rear edge 18 of the screed 16. The distance of the rear edge 18 of the screed 16 in relation to the reference coordinate system 6 is thereby constant. Analogously, it is possible to manage without a holder 19 if the sensors 2a, 2b, 2c are mounted directly on the tow arm 17. This is shown by FIG. 7. The sensors 2a, 2b, 2c are thereby arranged on the tow arm 17 in an ascending manner in the direction opposite the direction of travel V and are separated from one another by the distance L1. The horizontal distance between the rear-most sensor 2c and the rear edge 18 amounts to L2, which corresponds to a multiple of the distance L1.

Figure 8:
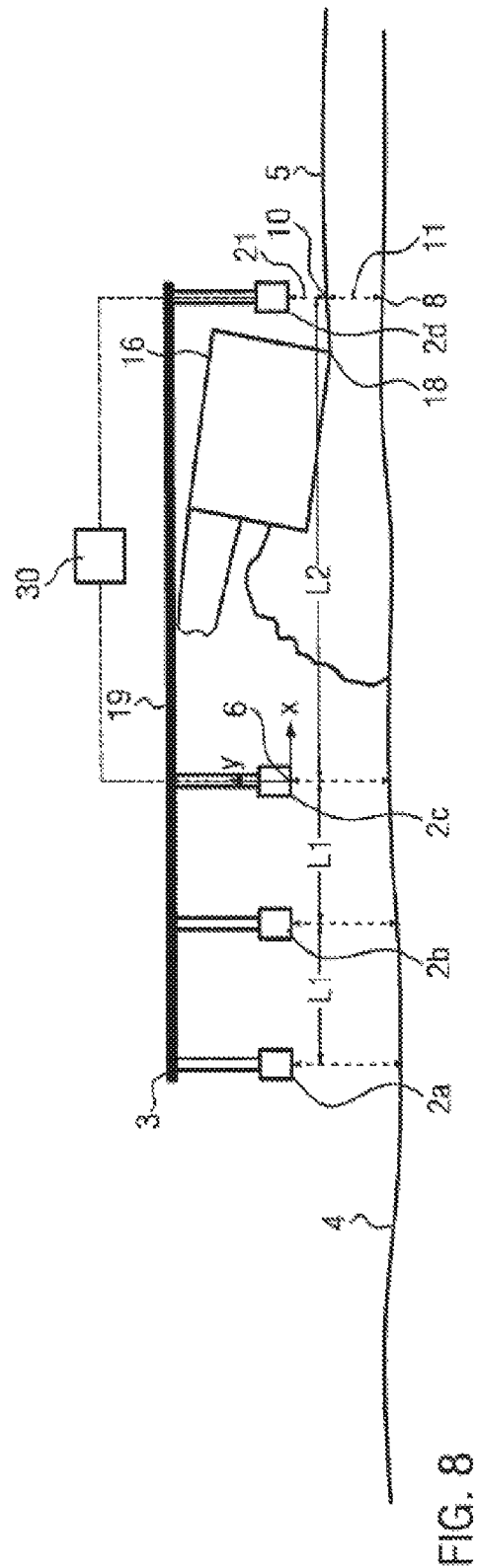

In a further embodiment according to FIG. 8, it is shown that the layer thickness measuring device 1 additionally comprises a fourth sensor 2d which is arranged behind the screed 16, seen in the direction of travel V. The layer thickness measuring device 1 comprises the sensor 2d, in order to be independent of the geometric shape of the screed 16 and of the road paver 20 when calculating the layer thickness. In accordance with FIG. 8, the layer thickness 11 is not determined under the rear edge 18 of the screed 16, and instead is determined underneath the sensor 2d, which is positioned in a known position relative to the coordinate system 6. The sensor 2d measures a distance 21 to the surface 5 of the constructed layer. By means of the distance 21 and the relative position of the sensors 2c, 2d it is possible for the evaluation unit 30 to determine the second vector 7. The layer thickness 11 can then be calculated with the first vector 9.

The present invention makes it possible to register an inclination reference without inclination sensors and with a reduced sensor expenditure, provided that the changes in inclination between two points to be measured are small. Due to the sensitivity of all inclination sensors to accelerations and vibrations and the imprecision as a consequence of this, there consequently additionally results an advantage in the achievable precision of the thickness measurement.

The invention claimed is:

1. A road paver for laying down a layer of laying material, the road paver comprising a movable screed and a layer thickness measuring device, having at least two sensors, one of the sensors configured to define a coordinate system, the sensors being formed to carry out a distance measurement to a pavement plane at intervals and to determine a first distance between the sensor and a point on the surface of the plane that is registered by the sensors, and wherein the layer thickness measuring device being configured determine a first vector determined by combining as vectors the distance to the plane measured by the sensor configured to define the coordinate system with a change of inclination of the coordinate system during a movement of the road paver relative to the plane to; said first vector and a second vector that is defined by the distance from the one sensor defining the coordinate system to a point that lies on the surface of the newly laid layer, being communicated to the layer thickness measuring device for use in determining the layer thickness of the laying material.

2. Road paver according to claim 1, wherein the layer thickness measuring device comprises an evaluation unit that is formed to register the displacement of the coordinate system.

3. Road paver according to claim 1, wherein the layer thickness measuring device comprises at least three sensors.

4. Road paver according to claim 3, wherein all of the at least three sensors are formed to carry out the distance measurement to the plane at intervals.

5. Road paver according to claim 3, wherein all of the at least three sensors are arranged equidistantly to one another in the direction of travel with respect to a distance.

6. Road paver according to claim 1, wherein the rear-most of the at least two sensors in the direction of travel defines the coordinate system.

7. Road paver according to claim 1, wherein the layer thickness measuring device is formed to measure the layer thickness at a place that is at a distance of at least the distance or of a multiple of the distance from the sensor that defines the coordinate system.

8. Road paver according to claim 1, wherein the layer thickness measuring device comprises a support arranged rigidly relative to the road paver.

9. Road paver according to claim 1, wherein the layer thickness measuring device comprises a holder arranged rigidly relative to a screed.

10. Road paver according to claim 8, wherein the support or holder supports the sensors spaced apart by the distance.

11. Road paver according to claim 1, wherein the sensors are arranged directly on a tow arm that supports the screed.

12. Road paver according to claim 1, wherein a screed of the road paver comprises a rear edge which, together with the layer thickness measuring device, defines the second vector.

13. Road paver according to claim 1, wherein the layer thickness measuring device comprises a sensor that is arranged behind the screed seen in the direction of travel.

14. Road paver according to claim 13, wherein at least one sensor together with the layer thickness measuring device defines the second vector.

15. Method for determining a layer thickness of a laying material laid on a plane by a road paver, wherein the road paver supports a movable screed and a layer thickness measuring device, which comprises at least two sensors, wherein one of the sensors is configured to define a coordinate system relative to the plane the method comprising
combining as vectors a first vector comprising the distance to the plane measured by the sensor configured to define the coordinate system with a change of inclination of the coordinate system during a movement of the coordinate system and a second vector comprising the distance from the sensor defining the coordinate system to a point on the surface of the newly laid pavement layer and
communicating the first and second vectors to the layer thickness measuring device for use in determining the layer thickness.

16. Method for determining the thickness of a laying material deposited on a plane by a road paving machine which comprises:
providing a measuring device including at least a first sensor that defines a coordinate system and a second sensor on the road paving machine,
defining a coordinate system using the first sensor,
determining a first vector by combining the distance to the plane measured by the sensor that defines the coordinate system with a change of inclination of the coordinate system during a movement of the coordinate system,
determining a second vector defined by the distance from the sensor that defines the coordinate system to a point that lies on the surface of the laying material deposited by the road paver ,and
communicating the first and second vectors to the measuring device and
calculating the thickness of the laying material deposited by the road paver by adding the first and second vectors.

17. The method of claim 16, which comprises determining the second vector between the coordinate system and a determined position of a rear edge connected to the paving machine.

18. The method of claim 17, which comprises mounting the measuring device on the screed of the road paving machine.

19. The method of claim 16, which comprises providing a third sensor for the measuring device and mounting the first, second and third sensors equidistant from one another on the screed.

20. The method of claim 16, which comprises providing a fourth sensor behind the screen for the measuring device.

* * * * *